United States Patent
Shinozaki et al.

(10) Patent No.: US 9,436,376 B2
(45) Date of Patent: Sep. 6, 2016

(54) LOAD REQUIRED TO CANCEL AN INPUT ON A TOUCH SENSOR IS ADJUSTED WHEN THE SLIDE OF A TOUCH OBJECT IS DETECTED

(75) Inventors: Takayuki Shinozaki, Kanagawa (JP); Makoto Tomizu, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 182 days.

(21) Appl. No.: 13/635,829

(22) PCT Filed: Feb. 24, 2011

(86) PCT No.: PCT/JP2011/001077
§ 371 (c)(1),
(2), (4) Date: Sep. 18, 2012

(87) PCT Pub. No.: WO2011/114630
PCT Pub. Date: Sep. 22, 2011

(65) Prior Publication Data
US 2013/0016056 A1   Jan. 17, 2013

(30) Foreign Application Priority Data

Mar. 18, 2010  (JP) .................................. 2010-062971

(51) Int. Cl.
*G06F 3/041* (2006.01)
*G06F 3/0486* (2013.01)

(52) U.S. Cl.
CPC ........... *G06F 3/0486* (2013.01); *G06F 3/0414* (2013.01); *G06F 3/0416* (2013.01)

(58) Field of Classification Search
None
See application file for complete search history.

(56) References Cited

U.S. PATENT DOCUMENTS

2002/0015064 A1* 2/2002 Robotham et al. ........... 345/863
2004/0021643 A1* 2/2004 Hoshino et al. .............. 345/173
2010/0057235 A1* 3/2010 Wang et al. .................... 700/94

FOREIGN PATENT DOCUMENTS

| CN | 1845043 A | 10/2006 |
|---|---|---|
| JP | 2000-200147 A | 7/2000 |
| JP | 2004070492 A * | 3/2004 |

(Continued)

OTHER PUBLICATIONS

An Office Action; "Decision of Rejection," issued by the Japanese Patent Office on Nov. 12, 2013, which corresponds to Japanese Patent Application No. 2012-505475 and is related to U.S. Appl. No. 13/635,829; with English concise explanation.

(Continued)

*Primary Examiner* — Ilana Spar
*Assistant Examiner* — Kirk Hermann
(74) *Attorney, Agent, or Firm* — Studebaker & Brackett PC (57) ABSTRACT

An electronic device for receiving an input based on a pressure load that reduces a risk of ending a drag operation despite a user's intention is provided.
The electronic device includes a touch sensor configured to detect a touch by a touch object, a load detection unit configured to detect a pressure load on a touch face of the touch sensor, and a control unit configured to enter or cancel an input receiving state for receiving an input based on the pressure load detected by the load detection unit. The control unit, in the input receiving state, controls to make a standard load for canceling the input receiving state when a slide of the touch object touching the touch face is detected and a standard load for canceling the input receiving state when the slide of the touch object touching the touch face is not detected different from each other.

4 Claims, 9 Drawing Sheets

(56) References Cited

FOREIGN PATENT DOCUMENTS

| JP | 2005-196810 A | | 7/2005 |
|---|---|---|---|
| JP | 2006-039745 A | | 2/2006 |
| JP | 2006-311224 A | | 11/2006 |
| JP | 2007080110 A | * | 3/2007 |

OTHER PUBLICATIONS

An Office Action: "Notice of Reasons for Rejection," issued by the Japanese Patent Office on Aug. 13, 2013, which corresponds to Japanese Patent Application No. 2012-505475 and is related to U.S. Appl. No. 13/635,829; with Concise Explanation.

International Search Report; PCT/JP2011/001077; Apr. 12, 2011.

An Office Action; "Notification of the First Office Action," issued by the State Intellectual Property Office of China on Sep. 25, 2014, which corresponds to Chinese Patent Application No. 201180014549.0 and is related to U.S. Appl. No. 13/635,829; with English translation.

* cited by examiner

LOAD REQUIRED TO CANCEL AN INPUT ON A TOUCH SENSOR IS ADJUSTED WHEN THE SLIDE OF A TOUCH OBJECT IS DETECTED

CROSS REFERENCE TO RELATED APPLICATION

This application claims priority to and the benefit of Japanese Patent Application No. 2010-62971 filed on Mar. 18, 2010, the entire contents of which are incorporated herein by reference.

TECHNICAL FIELD

The present invention relates to an electronic device, and more specifically, to an electronic device for performing a drag operation.

BACKGROUND ART

Input apparatuses of mobile terminals such as mobile phones, for example, used by users to operate the terminals have been developed in a variety of manners according to functions and usages of each of the terminals. In many cases, the input apparatus is configured to allow the user to perform an operation input by directly pressing down a mechanical key or button disposed on a face of a body of the mobile terminal.

Such mechanical keys (for example, a numerical keypad) of the input apparatus of the terminal are normally preliminarily arranged based on a main usage of the terminal. Accordingly, such original arrangement of the mechanical keys may generally not be changed.

Incidentally, a variety of functions are incorporated in small mobile terminals, such as functions for a digital camera and a music player. For example, recent mobile terminals such as mobile phones have numerous supplementary functions incorporated therein in addition to a main function, and PDAs (Personal Digital Assistant: mobile information terminal) have a plurality of main usages such as schedule management, an address book and the like. With the keys of such terminals fixedly arranged, the user may feel significantly inconvenient in using some functions.

In order to solve such inconvenience in operation input, there is disclosed an input apparatus having a touch panel constituted by using a transparent input unit arranged on top of a liquid crystal display constituting a display unit (for example, see Patent Document 1). The input apparatus having such a touch panel generally displays graphical images of operation keys and buttons (hereinafter, referred to as an "object") for the input operation on a display screen of the touch panel. When the user presses the object displayed on the display screen, the input unit receives an input at a corresponding position on the touch panel.

Since the input apparatus having the touch panel receives an input in the form of a user's direct contact (touch) to the object displayed on the display unit, the user may perform the input operation highly intuitively. That is, the user operates the input apparatus at the fingertip and the like by directly touching the object displayed on the display screen, following a guide displayed on the display screen of the touch panel. Accordingly, the user may operate the terminal extremely easily by an intuitive operation following the navigation displayed on the display screen, which offers an effect to reduce erroneous operations as a result.

As described above, since the touch panel increases a freedom of configuration of the input unit and allows the user to perform the operation input fairly instinctively, terminal apparatuses having the input apparatus with the touch panel have become more popular.

Incidentally, in order to further improve operability of the touch panel, there is suggested an input apparatus that has a load detection unit for detecting a pressure of a pressing operation to the touch panel and may receive an input based on the pressure load of an input by the user (for example, see Patent Document 2). This input apparatus may control not to receive the input unless the pressure on the touch panel is equal to or over a certain value. This input apparatus, accordingly, may prevent the erroneous operation to receive the input when the user lightly touches the touch panel inadvertently.

RELATED ART DOCUMENTS

Patent Documents

Patent Document 1: Japanese Patent Laid-Open No. 2006-311224
Patent Document 2: Japanese Patent Laid-Open No. 2006-039745

SUMMARY OF INVENTION

Technical Problem

The following is an assumed operation as the drag operation to change a display position of the object by the input apparatus for receiving the input based on the pressure applied by the user.

First, the input apparatus sets a standard load (referred to as an "input receiving standard load") for receiving the input and another standard load (referred to as an "input canceling standard load") for canceling the input. Then, when the pressure load detection unit detects the pressure load satisfying (exceeding) the input receiving standard load, the input apparatus receives the input. When the load detection unit, after the input is received, detects the pressure load not satisfying ("equal to" or "below") the input canceling standard load, the input apparatus cancels the received input.

In the drag operation to change the display position of the object, when a finger or a stylus pen performing the input operation slides on the touch panel while the pressure load of the input operation (touch) to the object displayed on the display unit is satisfying the input receiving standard load, the drag operation starts in response to such slide. Thereby, the object is displayed at the position on the display unit corresponding to the sliding finger or the like. Then, when the pressure load of the input operation (touch) to the object stops satisfying the input canceling standard load, the object being dragged is dropped. That is, when the load detection unit detects the pressure load not satisfying the input canceling standard load, the object being dragged is displayed at the position on the display unit touched by the touch object such as the finger or the like. Thereby, the drag operation ends.

In the drag operation of the input apparatus for receiving the input based on the pressure applied by the user, since whether to start or end dragging the object is determined based on the pressure load detected by the load detection unit, there is a risk that the drag operation is ended despite the user's intention. That is, when the display position of the object is moved in the drag operation, the object being dragged may be dropped at an unintended position. For example, in order to start dragging, the user needs to slide the finger or the like applying the pressure on the object. That is, the user needs to apply a force in a horizontal direction in addition to a force in the vertical direction, which has been applied on the object before the user slides the finger or the like. Accordingly, even when the pressure (scalar quantity) on the input apparatus by the user is the same before and after the user starts sliding, a vector of the pressure on the input apparatus is changed between before and after the slide. After start of the slide, therefore, the pressure in the vertical direction decreases as the pressure in the horizontal direction increases. When the pressure in the vertical direction decreases as described above, the pressure load detected by the load detection unit does not satisfy the input canceling standard load, whereby the object may be dropped unintentionally.

During the slide, similarly, when the pressure in the horizontal direction is increased for the purpose of increasing a sliding speed, the pressure load in the vertical direction decreases unintentionally, whereby the object may be dropped unintentionally as a result.

Accordingly, an object of the present invention in consideration of such conditions is to provide an electronic device that reduces the risk of ending the drag operation despite the user's intention.

Solution to Problem

In order to solve the above problems, an electronic device according to a first aspect of the present invention includes:

a touch sensor configured to detect a touch by a touch object;

a load detection unit configured to detect a pressure load on a touch face of the touch sensor; and a control unit configured to control to enter or cancel an input receiving state for receiving an input based on the pressure load detected by the load detection unit, wherein the control unit, in the input receiving state, controls to make a standard load for canceling the input receiving state when a slide of the touch object touching the touch face is detected and a standard load for canceling the input receiving state when the slide of the touch object touching the touch face is not detected different from each other.

A second aspect of the present invention is the electronic device according to the first aspect, wherein the control unit calculates a sliding speed of the touch object touching the touch face and controls to set the standard load for canceling the input receiving state when the slide is detected, based on the sliding speed.

A third aspect of the present invention is the electronic device according to the first or second aspect, wherein the control unit, when setting a new standard load for canceling the input receiving state in the input receiving state, if the pressure load detected by the load detection unit does not satisfy the new standard load for canceling the input receiving state, controls not to set the new standard load.

A fourth aspect of the present invention is the electronic device according to the first or second aspect, wherein the control unit, when setting the new standard load for canceling the input receiving state in the input receiving state, if the pressure load detected by the load detection unit does not satisfy a standard, made by adjusting the new standard load for canceling the input receiving state in a predetermined manner, controls not to set the new standard load.

Effect of the Invention

According to the electronic device of the present invention, a risk of ending a drag operation despite a user's intention is reduced.

DESCRIPTION OF EMBODIMENTS

Embodiments of the present invention will be described with reference to the accompanying drawings.

First Embodiment

Figure 1:
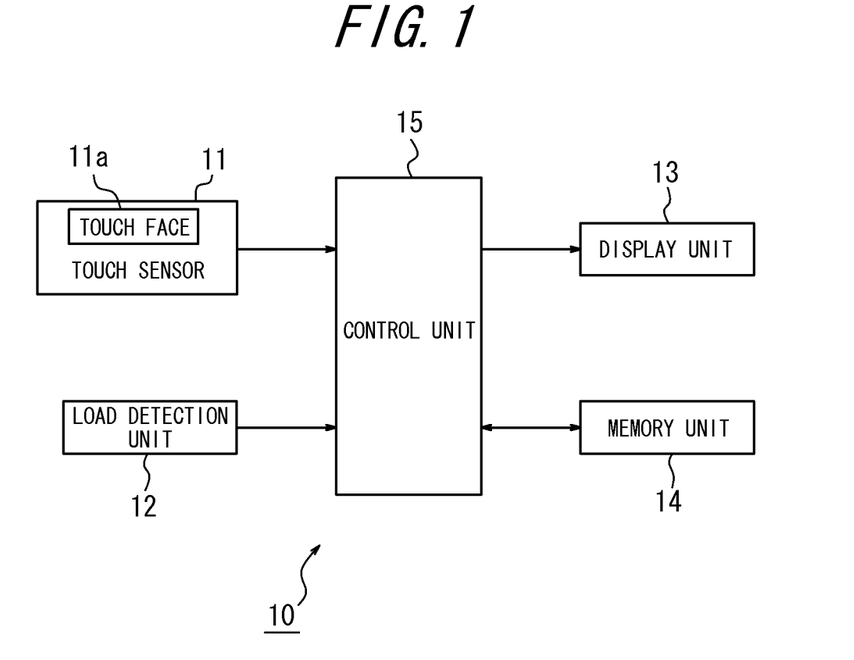
FIG. 1 is a functional block diagram illustrating an electronic device according to a first embodiment of the present invention.

FIG. 1 is a functional block diagram illustrating an electronic device 10 according to a first embodiment of the present invention. As illustrated in FIG. 1, the electronic device 10 includes a touch sensor 11, a load detection unit 12, a display unit 13, a memory unit 14 and a control unit 15 for controlling overall operations.

The touch sensor 11 detects a touch to a touch face 11a by a touch object such as a finger or a stylus pen (hereinafter, referred to simply as a "touch object") and may include a known type, such as a resistive film type, a capacitive type, an optical type and the like and is disposed on the display unit 13. A physical touch by the touch object is not necessary for the touch sensor 11 to detect the touch. For example, when the touch sensor 11 is of the optical type, the touch sensor 11 detects a position where an infrared ray or the like on the touch sensor 11 is blocked by the touch object. Accordingly, the touch object does not need physically touch the touch sensor 11. The load detection unit 12 detects a pressure load of a pressing input and detects, for example, the pressure load on the touch face 11a of the touch sensor 11. The load detection unit 12 is configured by using elements such as, for example, a strain gauge sensor or a piezoelectric element that reacts to a load.

The display unit 13 displays an input object (icon) and may be configured by using, for example, a liquid crystal display panel, an organic EL display panel or the like. The touch by the touch object to the input object such as an operation key or a button displayed on the display unit 13 (hereinafter, referred to simply as the "object") is detected by the control unit 15 based on position information output from the touch sensor 11. When a predetermined operation is performed to the input object, the control unit 15 starts an operation and activates an application corresponding to the input object.

The memory unit 14 stores various applications and a variety of input information, as well as functioning as a work memory. The memory unit 14 temporarily stores the pressure load on the touch face 11a detected by the load detection unit 12 for an operation of the control unit 15.

The control unit 15 may be constituted by using, for example, a CPU and the like and performs a drag operation based on position information from the touch sensor 11 and information about the pressure load from the load detection unit 12.

Figure 2:
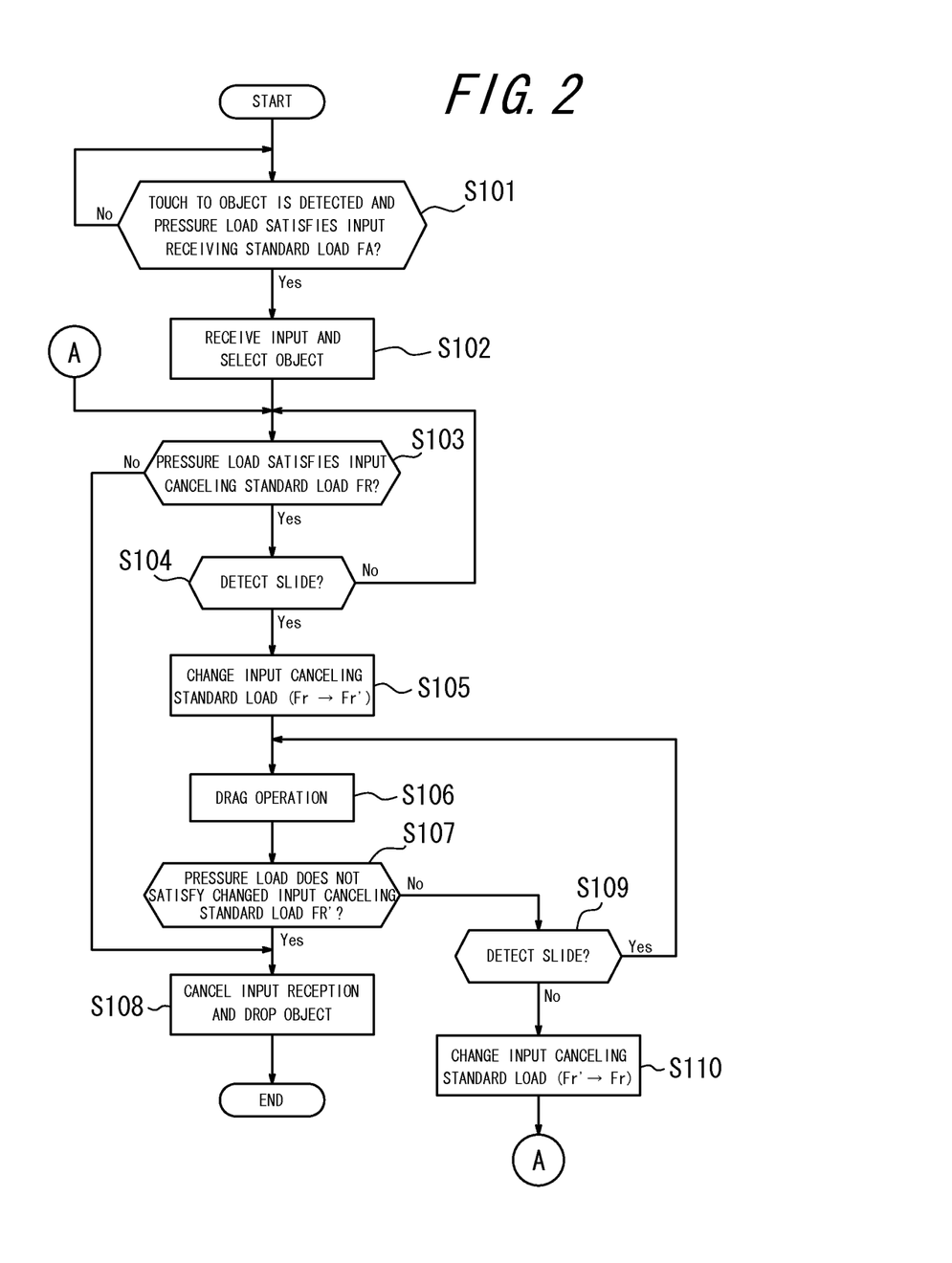
FIG. 2 is a flowchart illustrating a drag operation of the electronic device according to the first embodiment.

Next, the drag operation of the electronic device 10 according to the first embodiment will be described. FIG. 2 is a flowchart illustrating the drag operation of the electronic device 10 according to the present embodiment for moving a display position of the object on the display unit 13.

First, the control unit 15 detects the touch to the object displayed on the display unit 13 by using the touch sensor 11 and determines whether the pressure load detected by the load detection unit 12 satisfies a standard load Fa for receiving the input (hereinafter, referred to as an "input receiving standard load") (step S101). When the control unit 15 determines that the pressure load detected by the load detection unit 12 satisfies the input receiving standard load Fa, the control unit 15 enters an input receiving state for receiving an input based on the touch of the touch object detected by the touch sensor 11. When the control unit 15 determines that the touch sensor 11 is detecting the touch at a position corresponding to the object displayed on the display unit 13 and the pressure load detected by the load detection unit 12 satisfies the input receiving standard load Fa, the control unit 15 selects the object (step S102).

After step S102, the control unit 15 determines whether the pressure load detected by the load detection unit 12 satisfies a standard load Fr for canceling the input (hereinafter, referred to as an "input canceling standard load"), which is lower than the input receiving standard load Fa (step S103). When the control unit 15 determines that the pressure load detected by the load detection unit 12 satisfies the input canceling standard load Fr, the control unit 15 proceeds to step S104. On the other hand, when the control unit 15 determines that the pressure load detected by the load detection unit 12 does not satisfy the input canceling standard load Fr, the control unit 15 proceeds to step S108, which will be described below.

At step S104, the control unit 15 determines whether the touch object such as the finger or the like touching the selected object is sliding. That is, the control unit 15 determines whether a touch position of the touch object detected by the touch sensor 11 is moving. When the control unit 15 determines that the touch object touching the selected object is moving, the control unit 15 controls to set an input canceling standard load Fr' different from the input canceling standard load Fr (step S105). The input canceling standard load Fr' different from the input canceling standard load Fr is referred to as a changed input canceling standard load Fr'. The changed input canceling standard load Fr' is set for the purpose of, when the touch object touching the selected object is sliding and the control unit 15 is executing the drag operation of the object, preventing from canceling the input receiving state as the load detection unit 12 detects the pressure load that does not satisfy the input canceling standard load Fr due to a change in a pressure unintended by a user. In order to prevent cancel of the input receiving state, the control unit 15 may set the changed input canceling standard load Fr' to be lower than the original input canceling standard load Fr.

After step S105, the control unit 15 executes the drag operation and controls such that the selected object displayed on the display unit 13 is moved and displayed at a position on the display unit 13 corresponding to a sliding position (touching position) of the touch object on the touch face 11a of the touch sensor 11 (step S106). On the other hand, when the control unit 105 determines at step S104 that the touch object touching the selected object is not sliding, the control unit 15 returns to step S103.

After step S106, the control unit 15 determines whether the pressure load detected by the load detection unit 12 does not satisfy the changed input canceling standard load Fr' (step S107). When the control unit 15 determines that the pressure load detected by the load detection unit 12 does not satisfy the changed input canceling standard load Fr', the control unit 15 cancels the input receiving state and drops the selected object at the position on the display unit 13 corresponding to the touching position of the touch object on the touch face 11a of the touch sensor 11 (that is, the control unit 15 determines the position of the selected object) (step S108). When this process at step S108 is finished, the operation ends.

On the other hand, when the control unit 105 determines at step S107 that the pressure load detected by the load detection unit 12 satisfies the changed input canceling standard load Fr', the control unit 15 determines whether the touch object such as the finger or the like touching the selected object is sliding (step S109). When the control unit 105 determines at step S109 that the touch object touching the selected object is not sliding, the control unit 15 controls to restore the changed input canceling standard load Fr' to the original input canceling standard load Fr (step S110). After finishing the process at step S110, the control unit 15 returns to step S103. On the other hand, when the control unit 105 determines at step S109 that the touch object such as the finger or the like touching the selected object is sliding, the control unit 15 returns to step S106 and continues the operation.

In the above, the (input receiving or input canceling) standard load is described to be satisfied. Here, "when the standard load is satisfied" may be, by using a value of the standard load as a "threshold of the pressure load", for example, "when the pressure load detected by the load detection unit 12 reaches the value of the standard load". However, a condition to determine that "the standard load is satisfied" is not limited thereto but may be "when the pressure load detected by the load detection unit 12 exceeds the value of the standard load" or "when load detection unit 12 detects the pressure load equal to or over the value of the standard load".

In the above, also, the (input receiving or input canceling) standard load is described to be not satisfied. Here, "when the standard load is not satisfied" may be, by using the value of the standard load as the "threshold of the pressure load", for example, "when the pressure load detected by the load detection unit 12 is equal to or smaller than the value of the standard load". However, a condition to determine that "the standard load is not satisfied" is not limited thereto but may be "when the pressure load detected by the load detection unit 12 falls under the value of the standard load".

Figure 3:
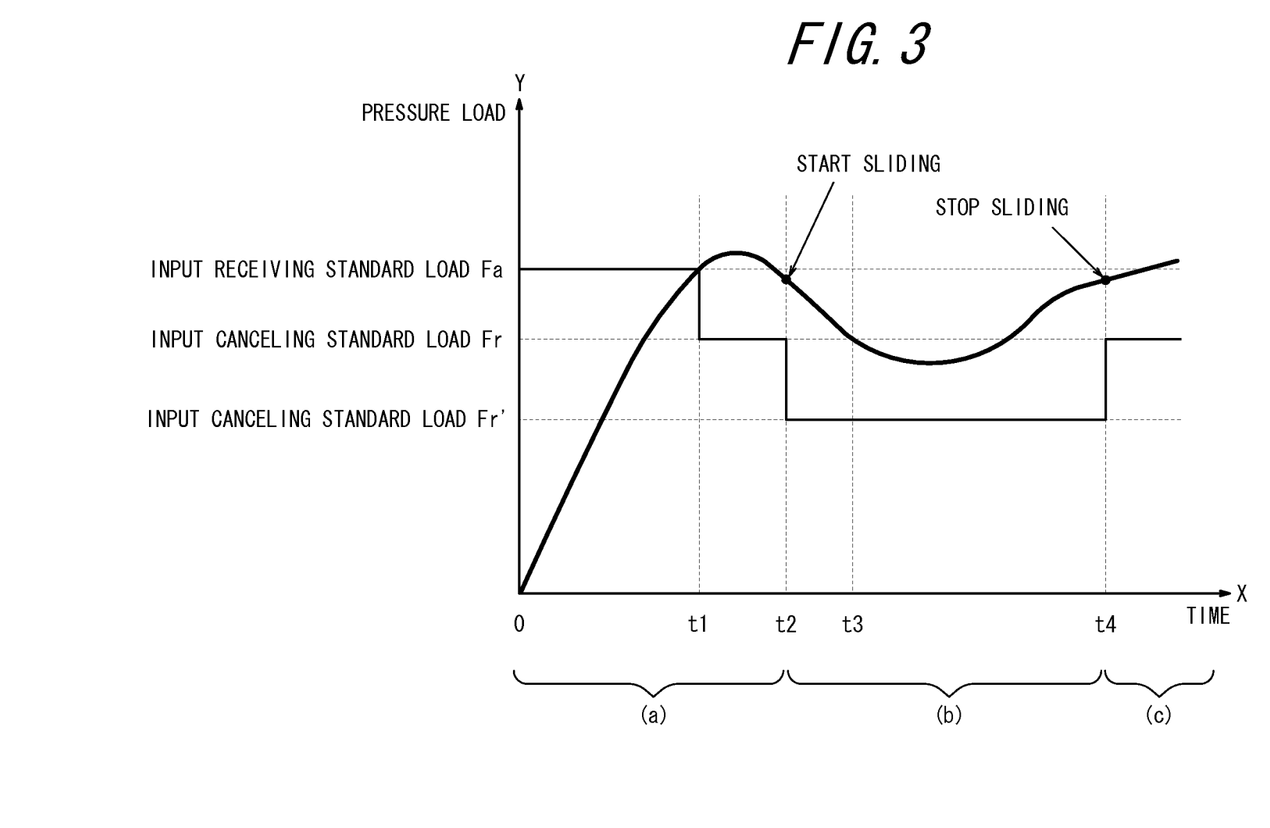
FIG. 3 is a graph illustrating a change in a pressure load detected by a load detection unit of the electronic device according to the first embodiment.

FIG. 3 is a graph illustrating a change in the pressure load detected by the load detection unit 12 of the electronic device 10 according to the first embodiment. In FIG. 3, an X-axis represents an elapse and a Y-axis represents the pressure load detected by the load detection unit 12. In FIG. 3, also, an original time point (0) represents a time point when the user touches the touch face 11a of the touch sensor 11, at which the pressure load is 0.

As illustrated in FIG. 3, when the user touches the object displayed on the display unit 13 and applies the pressure on the touch face 11a, the pressure load detected by the load detection unit 12 increases with time. At a time point t1 when the pressure load detected by the load detection unit 12 reaches (satisfies) the input receiving standard load Fa, the control unit 15 enters the input receiving state. Thereby, the input to the object is received and the object is selected. When the control unit 15 is not in the input receiving state (that is, when the input receiving state is canceled such that the input is not received), touch of the object displayed on the display unit 13 by the user is not received as the input and the object is not selected. After the object is selected, when the pressure load detected by the load detection unit 12 satisfies the input canceling standard load Fr and the user slides the touch object such as the finger or the like touching the object (at a time point t2), the control unit 15 controls to set the changed input canceling standard load Fr' different from the input canceling standard load Fr. Also, the control unit 15 executes the drag operation to control such that the selected object displayed on the display unit 13 is moved and displayed at the position on the display unit 13 corresponding to the sliding (touching) position of the touch object on the touch face 11a of the touch sensor 11.

After starting the drag operation as described above, the control unit 15 sets the changed input canceling standard load Fr' to prevent cancellation of the input receiving state. Therefore, when the pressure load detected by the load detection unit 12 stops satisfying (falls under) the input canceling standard load Fr at a time point t3 illustrated in FIG. 3 due to decrease in the pressure despite the user's intention, the input receiving state is not canceled. According to the electronic device of the present invention, therefore, the object undergoing the drag operation is not dropped at a position unintended by the user.

Then, when the user stops sliding the touch object touching the object at a time point t4, the control unit 15 controls to restore the changed input canceling standard load Fr' to the input cancel standard load Fr.

Figure 4:
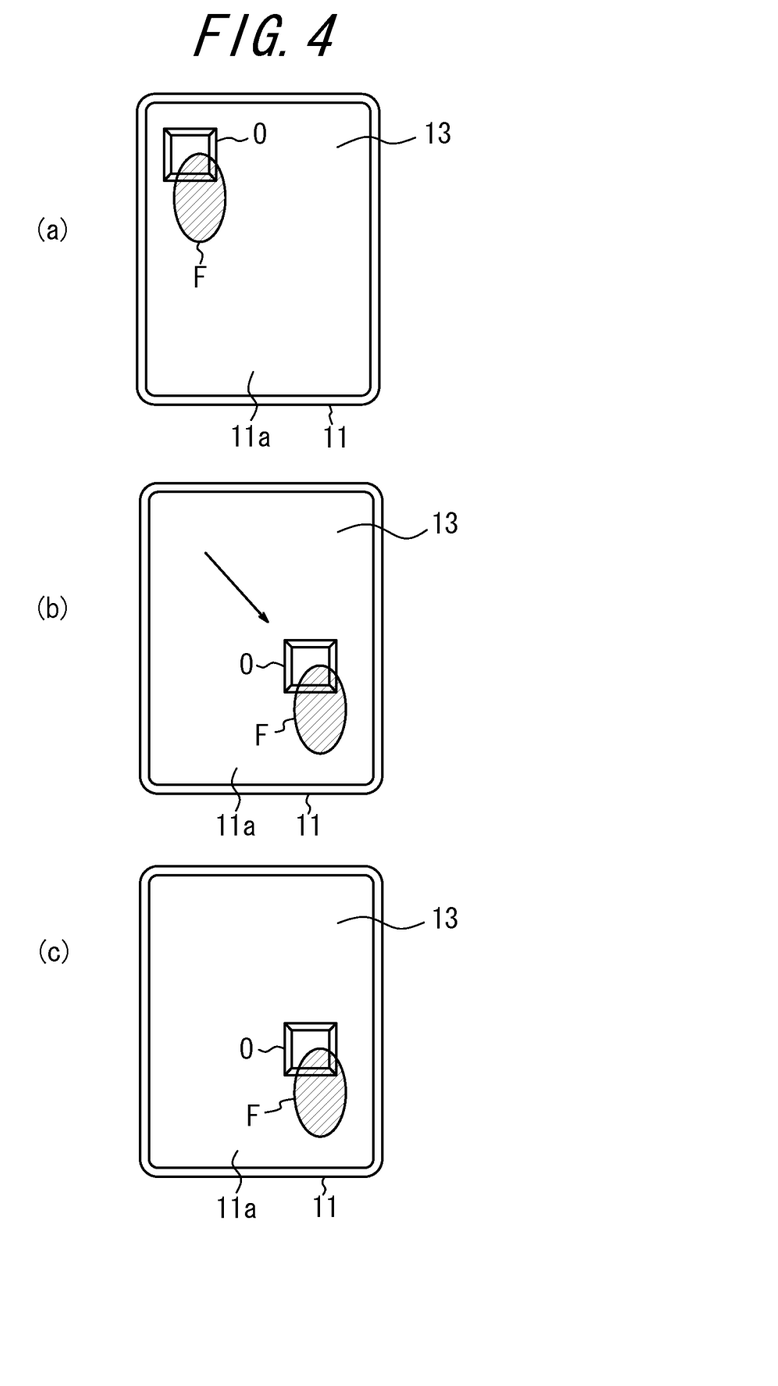
FIGS. 4a, 4b and 4c are diagrams illustrating states in a sliding operation of the electronic device according to the first embodiment.

FIG. 4 illustrates diagrams of states in the sliding operation of the electronic device 10 according to the first embodiment. Periods (a), (b) and (c) in FIG. 3 corresponds to states in FIGS. 4a, 4b and 4c, respectively.

FIG. 4a illustrates a state that a touch object F such as the finger or the like is touching an object O displayed on the display unit 13. When the user increases the pressure after touching the object O, the object O is selected. The state in FIG. 4a corresponds to the period (a) (from the time point 0 to t2) in FIG. 3.

Next, FIG. 4b illustrates a state that the touch object F such as the finger or the like is sliding on the touch face 11a of the touch sensor 11. The control unit 15 controls to start the drag operation in response to a slide of the touch object F such as the finger or the like. At this time, the control unit 15 controls such that, in accordance with the sliding operation by the user, the selected object O displayed on the display unit 13 is moved and displayed at the position on the display unit 13 corresponding to the sliding (touching) position of the touch object F on the touch face 11a of the touch sensor 11. The state in FIG. 4b corresponds to the period (b) (from the time point t2 to t4) in FIG. 3.

FIG. 4c illustrates a state that the sliding operation is stopped. The state in FIG. 4c corresponds to the period (b) (after the time point 4) in FIG. 3.

According to the present embodiment, as described above, a new input canceling standard load is set to be lower during the drag operation, the risk of dropping the object undergoing the drag operation despite the user's intention may be reduced.

Second Embodiment

Next, the electronic device 10 according to a second embodiment will be described. The electronic device 10 according to the second embodiment may have a similar configuration to the input apparatus 10 in the first embodiment with different processing and operation of the control unit 15. Hence, the same descriptions as those of the first embodiment set forth above will be omitted appropriately.

Figure 5:
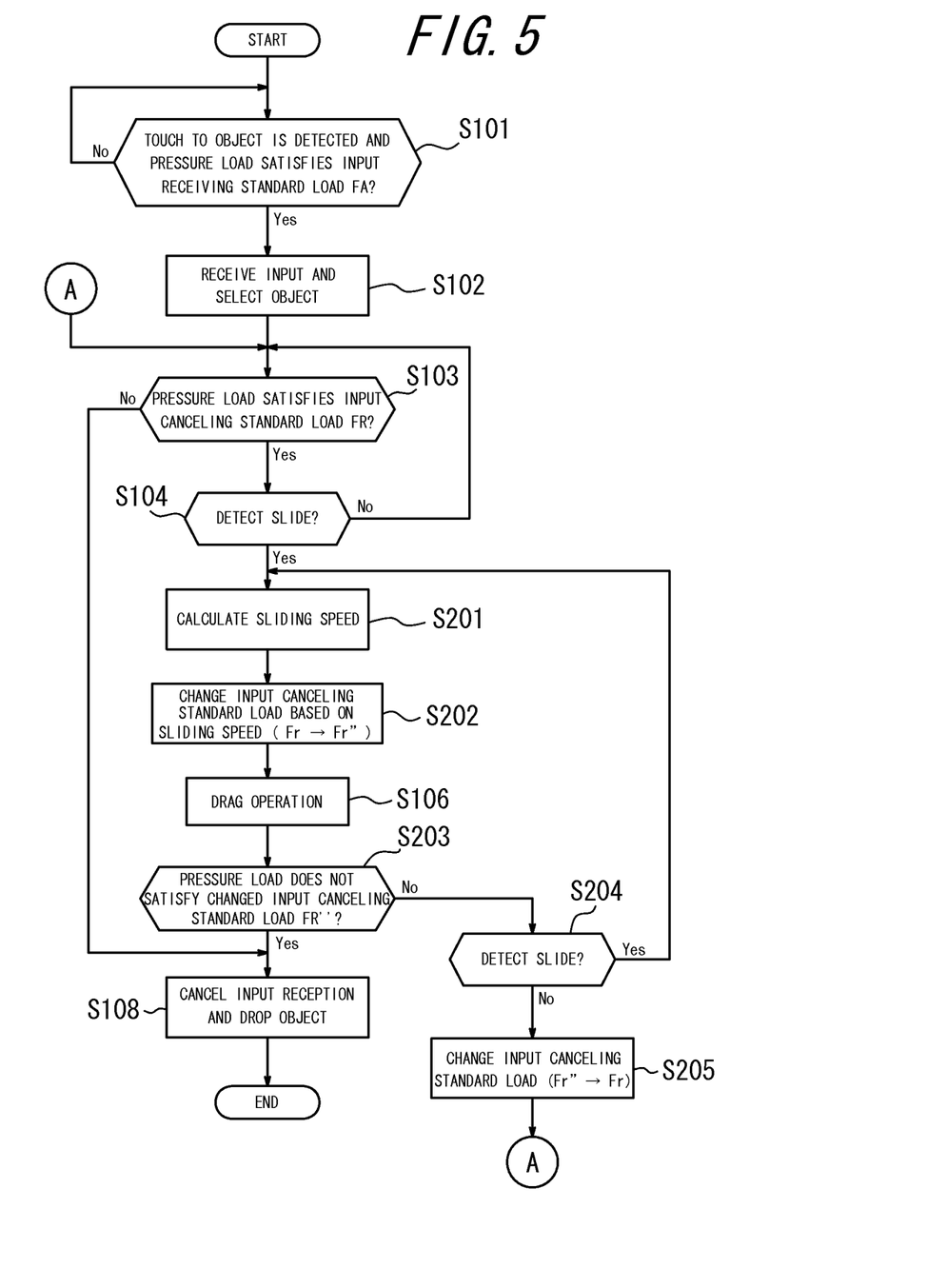
FIG. 5 is a flowchart illustrating the drag operation of the electronic device according to a second embodiment.

An input processing according to the second embodiment will be described with reference to a flowchart in FIG. 5. In the flowchart in FIG. 5, steps similar to those in FIG. 2 have the same step numbers.

When the control unit 15 determines at step S104 that the touch object touching the selected object is sliding, the control unit 15 proceeds to step S201 and calculates a sliding speed. Any calculation method that may calculate the sliding speed of the touch object, such as a calculation method based on a moving amount in a predetermined period, may be employed. After calculating the sliding speed at step S201, the control unit 15 controls to set an input canceling standard load Fr" different from the input canceling standard load Fr based on the sliding speed (step S202). The input canceling standard load Fr" different from the input canceling standard load Fr is referred to as a changed input canceling standard load Fr". The changed input canceling standard load Fr" is determined based on the sliding speed. When the sliding speed is fast, it is preferable to set the changed input canceling standard load Fr" to be greatly different from the input canceling standard load Fr. That is, it is preferable to set, in proportion to the sliding speed, the changed input canceling standard load Fr" to be lower.

When the pressure (scalar quantity) on the electronic device 10 by the user is at a certain value, the pressure load detected by the load detection unit 12 tends to decrease as the pressure in the horizontal direction on the touch panel increases in proportion to the sliding speed of the touch object such as the finger or the like. When the sliding speed is faster, accordingly, the pressure load detected by the load detection unit 12 is likely to be smaller. As a result, there is a risk of ending the drag operation despite the user's intention. In consideration of that the drag operation is likely to be ended despite the user's intention in proportion to the sliding speed as described above, it is preferable to set the changed input canceling standard load Fr" to be lower as the sliding speed is faster. Thereby, the risk of ending the drag operation despite the user's intention may be reduced.

After executing the drag operation at step S106, the control unit 15 determines whether the pressure load detected by the load detection unit 12 does not satisfy the changed input canceling standard load Fr" (step S203). When the control unit 15 determines that the pressure load detected by the load detection unit 12 satisfies the changed input canceling standard load Fr", the control unit 15 determines whether the touch object such as the finger or the like touching the selected object is sliding (step S204). When the control unit 15 determines at step S204 that the touch object such as the finger or the like touching the selected object is not sliding, the control unit 15 controls to restore the changed input canceling standard load Fr" to the input canceling standard load Fr. After step S205, the control unit 15 returns to step S103 to control such that the operation is continued. On the other hand, when the control unit 15 determines at step S204 that the touch object such as the finger or the like touching the selected object is sliding, the control unit 15 returns to step S201. At step S201, the control unit 15 calculates the sliding speed of the touch object touching the selected object (step S201) and controls to set the input canceling standard load Fr", different from the input canceling standard load Fr, based on the calculated sliding speed (step S202). Thereby, the input canceling standard load Fr" may be changed in accordance with the change in the sliding speed of the touch object.

Figure 6:
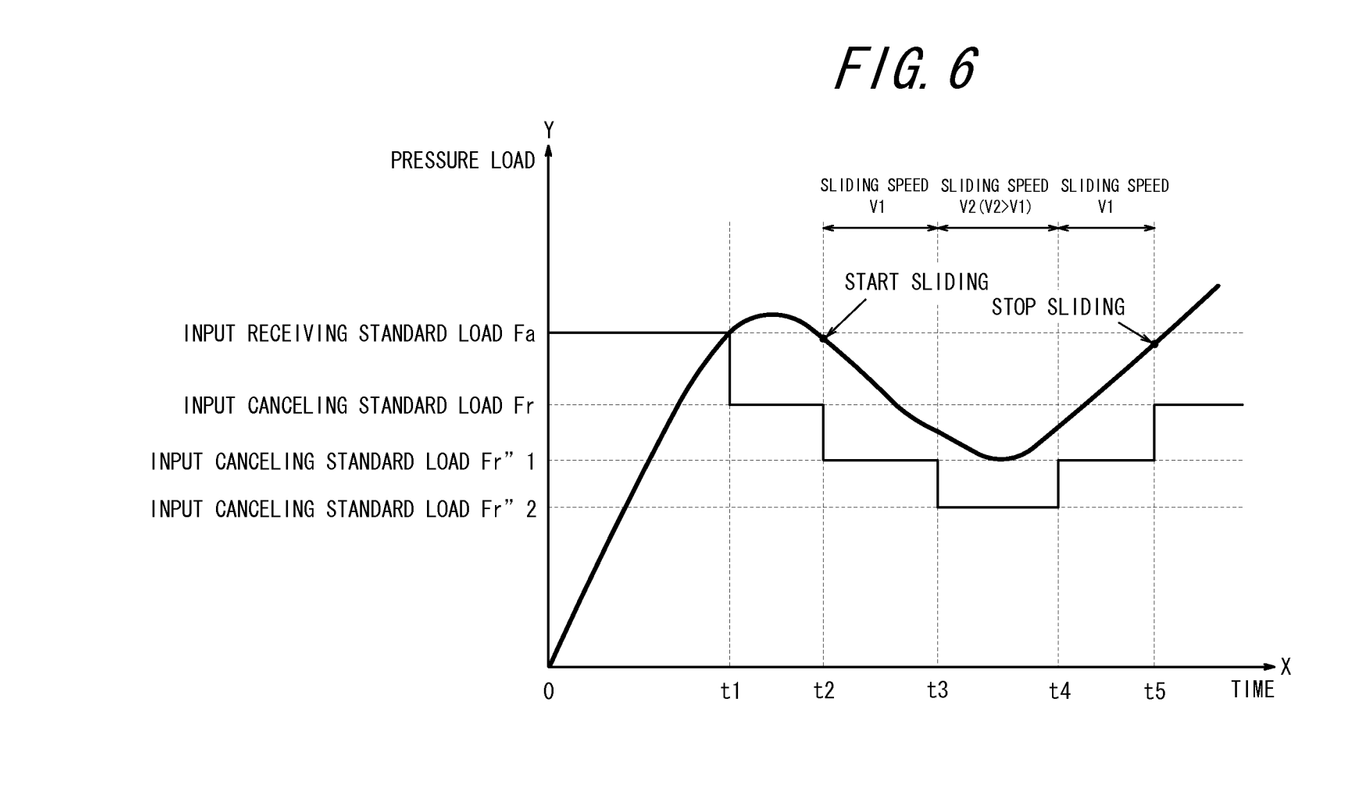
FIG. 6 is a graph illustrating the change in the pressure load detected by the load detection unit of the electronic device according to the second embodiment.

FIG. 6 is a graph illustrating the change in the pressure load detected by the load detection unit 12 of the electronic device 10 according to the second embodiment. In FIG. 6, the X-axis represents the elapse and the Y-axis represents the pressure load detected by the load detection unit 12. In FIG. 6, also, the original point (0) represents the point when the user touches the touch face 11a of the touch sensor 11, at which the pressure load is 0.

As illustrated in FIG. 6, when the user touches the object displayed on the display unit 13 and applies the pressure on the touch face 11a, the pressure load detect by the load detection unit 12 increases with time. When the pressure load detected by the load detection unit 12 reaches (satisfies) the input receiving standard load Fa at the time point t1, the control unit 15 enters the input receiving state. Thereby, the input to the object is received and the object is selected. Then, when the user slides the touch object such as the finger or the like touching the object at a sliding speed V1 (at the time point t2) while the pressure load detected by the load detection unit 12 satisfies the input canceling standard load Fr, the control unit 15 controls to set an input canceling standard load (changed input canceling standard load) Fr"1 different from the input canceling standard load Fr. Also, the control unit 15 executes the drag operation such that the selected object displayed on the display unit 13 is moved and displayed at the position on the display unit 13 corresponding to the sliding (touching) position of the touch object on the touch face 11a of the touch sensor 11.

Then, when the user slides the touch object such as the finger or the like at a sliding speed V2 faster than the V1 (at the time point t3), the control unit 15 sets an input canceling standard load (changed input canceling standard load) Fr"2 lower than the changed input canceling standard load Fr"1. Subsequently, when the user slides the touch object such as the finger or the like at the sliding speed V1 (at a time point t4), the control unit 15 sets the changed input canceling standard load Fr"1 as the input canceling standard load. Then, when the user stops sliding the touch object such as the finger or the like, the control unit 15 restores the input canceling standard load Fr.

According to the present embodiment, as described above, since a new input canceling standard load is set based on the sliding speed of the touch object such as the user's finger or the like to be lower in proportion to the sliding speed, the input receiving state is prevented from being canceled. Accordingly, the risk of dropping the object undergoing the drag operation despite the user's intention may be reduced.

Third Embodiment

Next, the electronic device 10 according to a third embodiment of the present invention will be described. The electronic device 10 according to the second embodiment may have a similar configuration to the input apparatus 10 in the first embodiment with different processing and operation of the control unit 15. Hence, the same descriptions as those of the first embodiment set forth above will be omitted appropriately.

According to the first and second embodiments described above, when the slide of the touch object such as the user's finger or the like touching the object is not detected after being detected, the changed input canceling standard load is restored to the original input canceling standard load. According to the first embodiment, that is, when it is determined at step S109 that the touch object such as the finger or the like touching the selected object is not sliding, the control unit 15, at step S110, controls to restore the changed input canceling standard load Fr' to the original input canceling standard load Fr. According to the second embodiment, also, when it is determined at step S204 that the touch object such as the finger or the like touching the selected object is not sliding, the control unit 15, at step S205, controls to restore the changed input canceling standard load Fr" to the original input canceling standard load Fr.

In controlling in such a manner, when the pressure load of the user (pressure load detected by the load detection unit 12) at a time point when the slide of the touch object such as the user's finger or the like is not detected after being detected does not satisfy the original input canceling standard load, the input receiving state is canceled and the object is dropped. Therefore, when the user does not apply a predetermined pressure when stopping sliding, the input receiving state may be canceled immediately despite the user's intention and the object may be dropped. A flow of these behaviors according to the first embodiment, for example, will be described. When the slide is not detected at step S109, the changed input canceling standard load Fr' is restored to the original input canceling standard load Fr at step S110. Then, when the pressure load does not satisfy the original input canceling standard load Fr at step S103, the input receiving state is cancelled at step S108 and the object is dropped.

According to the present embodiment, therefore, when the pressure of the user (the pressure load detected by the load detection unit 12) at the time point when the slide of the touch object such as the user's finger or the like is not detected after being detected does not satisfy the original input canceling standard load, the changed input canceling standard load is not restored to the original input canceling standard load, for example.

The input processing according to the third embodiment will be described with reference to a flowchart in FIG. 7. In the flowchart in FIG. 7, steps similar to those in FIG. 2 have the same step numbers. The third embodiment may be substantialized by adding an operation to the operations according to the first and second embodiments. The following is a description of the operations according to the third embodiment including a predetermined operation in addition to the first embodiment.

Figure 7:
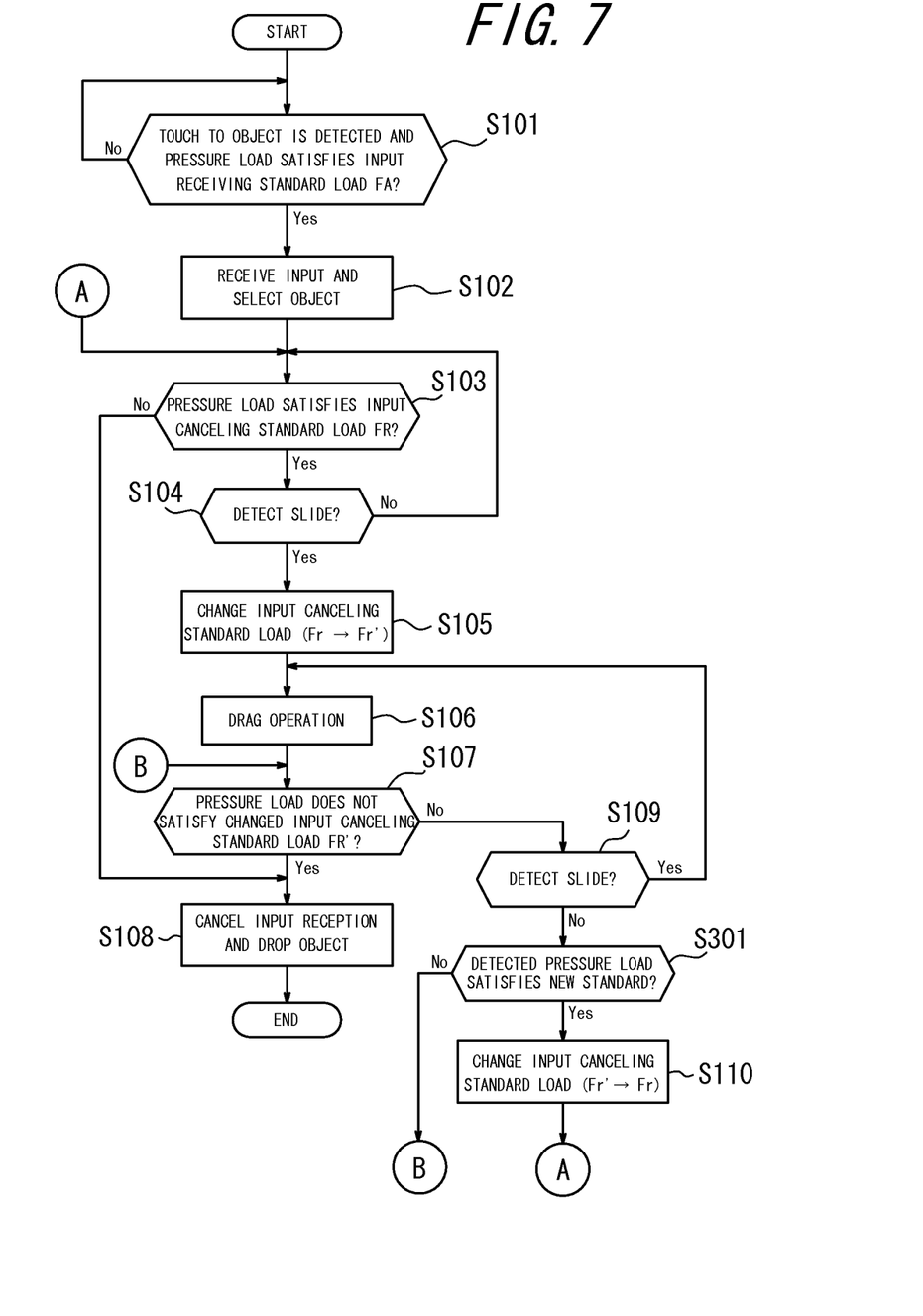
FIG. 7 is a flowchart illustrating the drag operation of the electronic device according to a third embodiment.

According to the third embodiment, as illustrated in FIG. 7, when the slide is not detected at step S109, the control unit 15 determines whether the pressure load detected by the load detection unit 12 satisfies a new standard (step S301). Here, the "new standard" may be the original input canceling standard load Fr, for example. When it is determined at step S301 that the pressure load detected by the load detection unit 12 satisfies the new standard, the control unit 15, in the same manner as the first embodiment, controls to restore the changed input canceling standard load Fr' to the original input canceling standard load Fr (step S110).

On the other hand, when it is determined at step S301 that the pressure load detected by the load detection unit 12 does not satisfy the new standard, the control unit 15 proceeds to step S107 without executing the process at step S110. At step S107 and thereafter, in the same manner as the first embodiment set forth above, the control unit 15 determines whether the pressure load detected by the load detection unit 12 satisfies the changed input canceling standard load Fr' and, when the pressure load does not satisfy the changed input canceling standard load Fr', cancels the input receiving state and drops the object. On the other hand, at step S107, when the pressure load detected by the load detection unit 12 satisfies the changed input canceling standard load Fr', the control unit 15 executes processes at step S109 and thereafter.

According to the present embodiment, that is, at the input receiving state, the control unit 15, when setting a new standard load for canceling the input receiving state, if the pressure load detected by the load detection unit 12 does not satisfy the new standard load for canceling the input receiving state, the control unit 15 controls not to set the new standard load.

Figure 8:
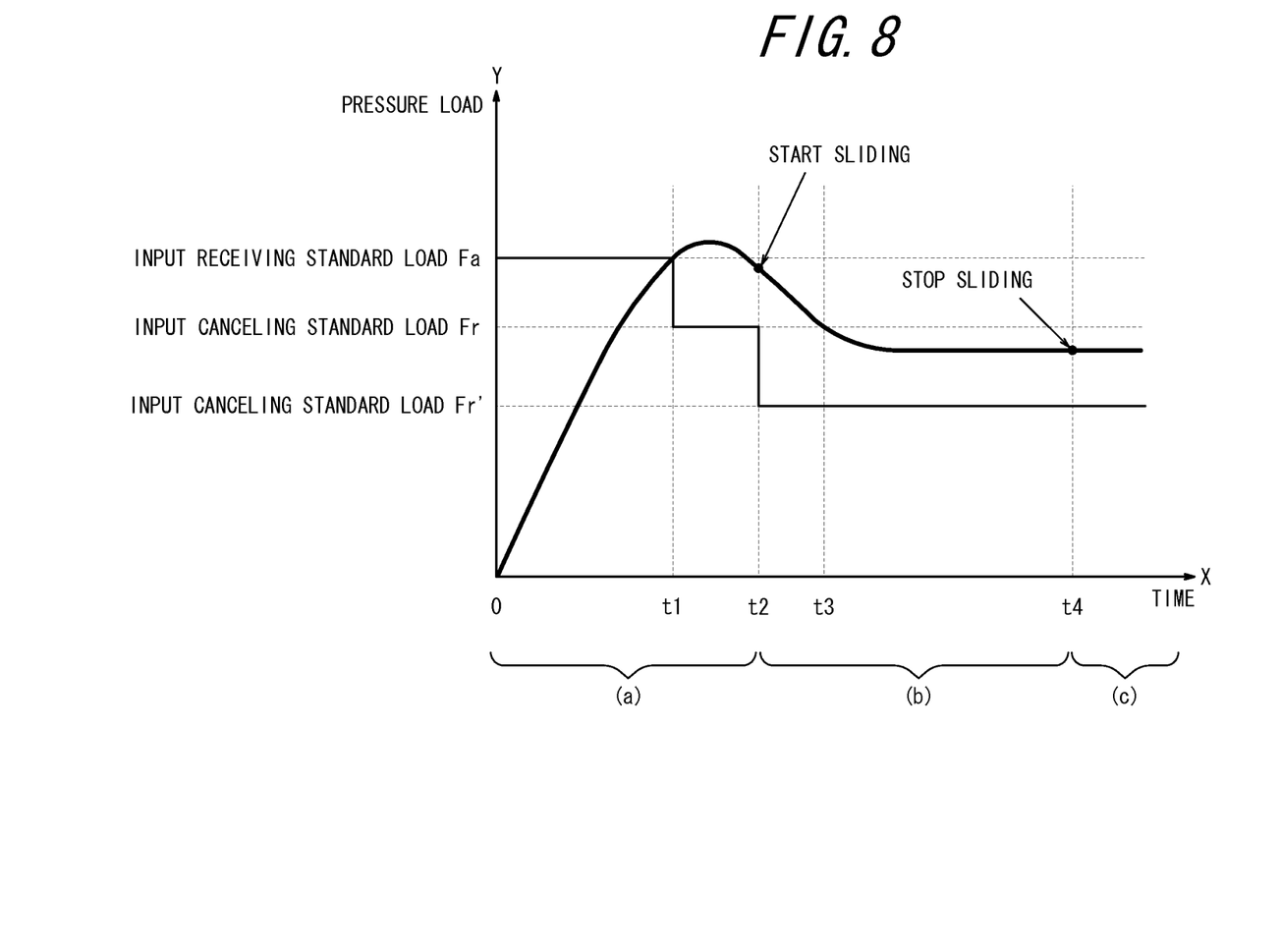
FIG. 8 is a graph illustrating the change in the pressure load detected by the load detection unit of the electronic device according to the third embodiment.

FIG. 8 is a graph illustrating the change in the pressure load detected by the load detection unit 12 of the electronic device 10 according to the third embodiment. In FIG. 8, the X-axis represents the elapse and the Y-axis represents the pressure load detected by the load detection unit 12. In FIG. 8, also, the original point (0) represents the time point when the user touches the touch face 11a of the touch sensor 11, at which the pressure load is 0.

As illustrated in FIG. 8, when the slide stops at the time point t4, the pressure load detected by the load detection unit 12 does not satisfy the new standard (here, the original input canceling standard load Fr). In this case, if the changed input canceling standard load Fr' is restored to the original input canceling standard load Fr as described with reference to FIG. 3, the input receiving state is canceled immediately and the object is dropped. According to the present embodiment, however, the control unit 15, as illustrated in FIG. 8, does not restore the changed input canceling standard load Fr' to the original input canceling standard load Fr. That is, the control unit 15 does not set the new standard load for canceling the input receiving state. Therefore, when the user stops sliding while maintaining the pressure, for example, cancel of the input receiving state and drop of the object are prevented.

According to the present embodiment, as described above, when the slide stops, the risk of dropping the object undergoing the drag operation despite the user's intention may be reduced.

Note that, although the third embodiment illustrated in FIG. 7 is substantialized by adding the operation to the first embodiment described with reference to FIG. 2, the third embodiment may also be substantialized by adding the operation to the second embodiment described with reference to FIG. 5.

Fourth Embodiment

Next, the electronic device 10 according to a fourth embodiment of the present invention will be described. The electronic device 10 according to the fourth embodiment may have a similar configuration to the input apparatus 10 in the first embodiment with different processing and operation of the control unit 15. Hence, the same descriptions as those of the first embodiment set forth above will be omitted appropriately.

According to the fourth embodiment, the process at step S301 according to the third embodiment is altered. According to the third embodiment described above, the new standard load for canceling the input receiving state is not set when the pressure load detected by the load detection unit 12 does not satisfy the new standard load for canceling the input receiving state. In this case, for example, when the pressure load detected by the load detection unit 12 is just enough to satisfy the new standard load for canceling the input receiving state, the new standard load is set. Accordingly, when the new standard load for canceling the input receiving state is set, the slightest decrease in the pressure of the user causes immediate cancel of the input receiving state and the object may be dropped.

According to the present embodiment, therefore, the new standard load for canceling the input receiving state is not set when the pressure load detected by the load detection unit 12 does not satisfy a standard load for canceling the input receiving state adjusted in a predetermined manner. Here, the "standard load for canceling the input receiving state adjusted in the predetermined manner" may be, for example, a standard made up of the new standard load for canceling the input receiving state and a predetermined load added thereto. According to the present embodiment, that is, at the input receiving state, the control unit 15, when setting the new standard load for canceling the input receiving state, controls not to set the new standard load unless the pressure load detected by the load detection unit 12 satisfies the new standard load for canceling the input receiving state adjusted in the predetermined manner.

Figure 9:
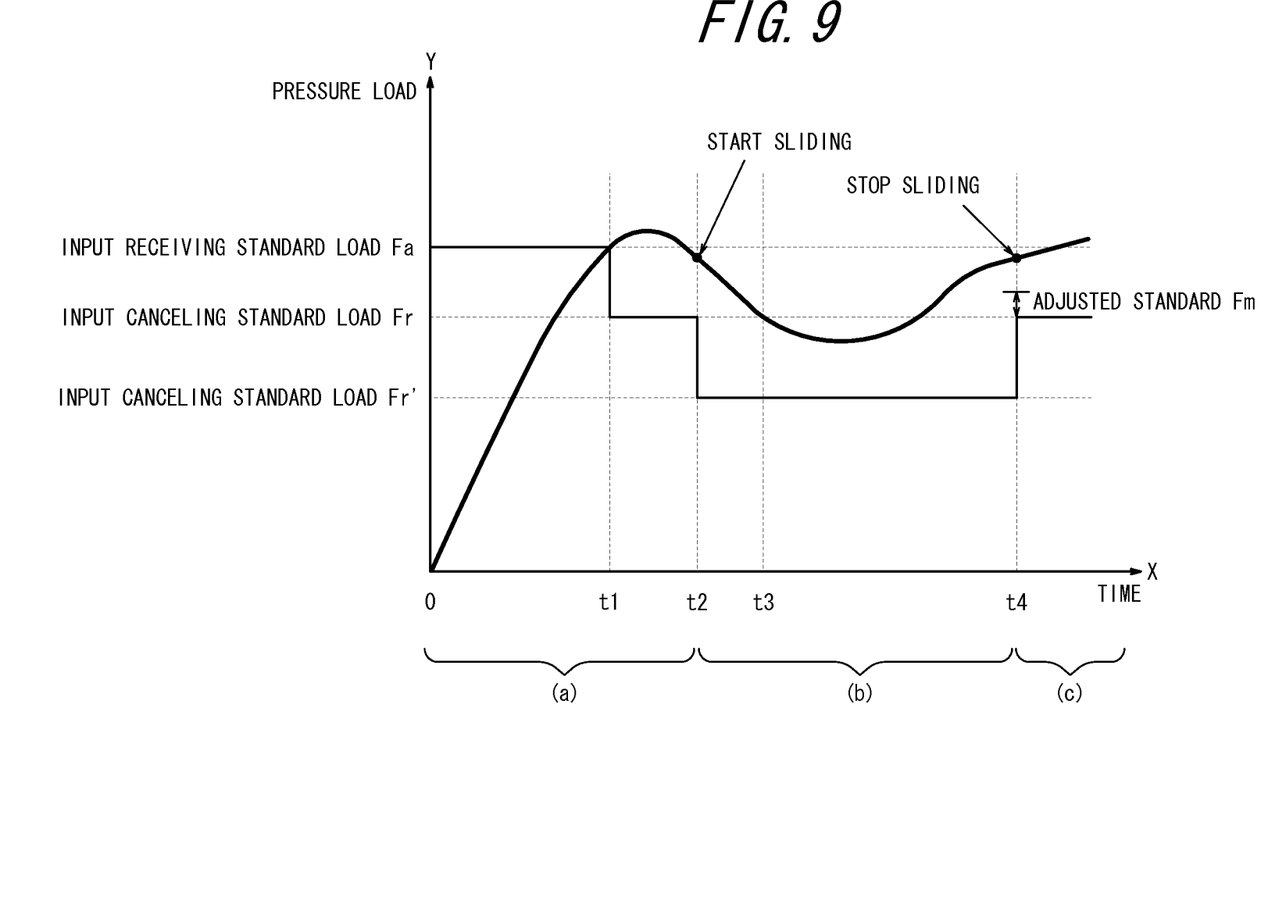
FIG. 9 is a graph illustrating the change in the pressure load detected by the load detection unit of the electronic device according to a fourth embodiment.

FIG. 9 is a graph illustrating the change in the pressure load detected by the load detection unit 12 of the electronic device 10 according to a fourth embodiment. In FIG. 9, the X-axis represents the elapse and the Y-axis represents the pressure load detected by the load detection unit 12. In FIG. 9, also, the original point (0) represents the time point when the user touches the touch face 11a of the touch sensor 11, at which the pressure load is 0.

According to the present embodiment, as illustrated in FIG. 9, for example, if the pressure load detected by the load detection unit 12 when the slide stops at the time point t4 satisfies a standard Fm, which is the new standard load adjusted in the predetermined manner, the control unit 15 controls to set the new standard load. According to the present embodiment, on the other hand, if the pressure load detected by the load detection unit 12 when the slide stops at the time point t4 does not satisfy the standard Fm, the control unit 15 controls not to set the new standard load.

According to the present embodiment, as described above, if the pressure load detected by the load detection unit 12 at a time point when the user stops sliding does not satisfy a standard set to be slightly higher than the new standard load, for example, the new standard load is not set. Thereby, when the new standard load for canceling the input receiving state is set, the inconvenience of canceling the input receiving state immediately due to a slight decrease in the user's pressure and dropping the object is solved.

According to the present embodiment, as described above, when the slide stops, the risk of dropping the object undergoing the drag operation despite the user's intention may be further reduced.

Although the fourth embodiment is substantialized by adding the operation to the first embodiment described with reference to FIG. 2, the fourth embodiment, in the same manner as the third embodiment described above, may also be substantialized by adding the operation to the second embodiment described with reference to FIG. 5.

Although the present invention is described based on the figures and the embodiments, it is to be understood that those who are skilled in the art may easily vary or alter in a multiple manner based on disclosure of the present invention. Accordingly, such variation and alteration are included in a scope of the present invention.

According to the embodiments of the present invention, although the input receiving standard load Fa and the input canceling standard load Fr take different (values of) standard loads, the Fa and the Fr may take the same (value of) standard load.

According to the embodiments, also, the same input canceling standard load Fr is set before start of the slide and after stop of the slide. However, when the slide stops (at the time point t4 according to the first embodiment and at the time point t5 according to the second embodiment), a new input canceling standard load may be set based on the pressure load detected by the load detection unit 12. The new input canceling standard load is preferably lower than the pressure load detected by the load detection unit 12 when the slide stops.

According to the embodiments, further, although the touch sensor 11 detects a contact to the touch face 11*a* of the touch sensor 11, it is also possible to determine, by using the load detection unit 12, that there is a contact when a predetermined load standard is satisfied.

Moreover, the load detection unit 12 may be constituted according to an input detection scheme of the touch sensor 11. For example, the load detection unit may be constituted without using the strain gauge sensor if the load may be detected from a change of an output signal based on a resistance change relative to a contact area in using the resistive film type. Alternatively, the load detection unit may be constituted without using the strain gauge sensor if the load may be detected from a change in an output signal based on a change in capacitance in using the capacitive type.

Further, the touch sensor 11 and the display unit 13 in the embodiments set forth above may be constituted by an integrated device, such as a common substrate having functions of them and the like. Such an integrated device having both functions of the display unit and the contact detection unit may have a configuration in which, for example, a plurality of photoelectric conversion elements such as photodiodes are orderly mixed in a group of pixel electrodes arranged in a matrix pattern in the liquid crystal panel. This integrated device may display an image in a structure of the liquid crystal panel and also detect a touch position by nearby photoelectric conversion elements that receive backlight of the liquid crystal display reflected by a tip of a pen executing a touch input at a desired position on the face of the panel.

REFERENCE SIGNS LIST

11 touch sensor
11*a* touch face
12 load detection unit
13 display unit
14 memory unit
15 control unit

The invention claimed is:

1. An electronic device comprising:
   a touch sensor configured to detect a touch by a touch object;
   a load detection unit configured to detect a pressure load at a specific location on a touch face of the touch sensor; and
   a control unit configured to control to enter an input based on the pressure load detected at the specific location of the touch face by the load detection unit, wherein
   the control unit cancels the input based on a first standard load when a slide of the touch object is detected at the specific location of the touch face, and cancels the input based on a second standard load when the touch object is detected, but a slide of the touch object is not detected at the specific location of the touch face.

2. The electronic device according to claim 1, wherein the control unit calculates a sliding speed of the touch object and controls to cancel the input when the slide is detected, based on the sliding speed.

3. The electronic device according to claim 1, wherein the control unit, when setting a new standard load for canceling the input in the input receiving state, if the pressure load detected by the load detection unit does not satisfy the new standard load for canceling the input, controls not to set the new standard load.

4. The electronic device according to claim 1, wherein the control unit, when setting a new standard load for canceling the input in the input receiving state, if the pressure load detected by the load detection unit does not satisfy a standard, obtained by adjusting the new standard load for canceling the input in a predetermined manner, controls not to set the new standard load.

* * * * *